United States Patent [19]

Hayashida et al.

[11] Patent Number: 4,968,764

[45] Date of Patent: Nov. 6, 1990

[54] RUBBER COMPOUNDING MATERIAL AND COMPOSITION

[75] Inventors: Suetou Hayashida; Kirou Yanagimoto, both of Chiba, Japan

[73] Assignee: Maruzen Petrochemical Co., Ltd., Tokyo, Japan

[21] Appl. No.: 289,153

[22] Filed: Dec. 23, 1988

Related U.S. Application Data

[63] Continuation-in-part of Ser. No. 61,526, Jun. 15, 1987, abandoned.

[30] Foreign Application Priority Data

Jun. 14, 1986 [JP] Japan ................... 61-138665

[51] Int. Cl.$^5$ .................... C08F 210/14; C08L 7/00; C08L 9/00; C08L 23/18
[52] U.S. Cl. .................... 526/283; 526/290; 526/308; 525/211; 525/216
[58] Field of Search .................. 526/283, 308, 290; 525/216, 211

[56] References Cited

U.S. PATENT DOCUMENTS

| | | | |
|---|---|---|---|
| 3,927,144 | 12/1975 | Hayashi et al. | 526/308 X |
| 3,987,123 | 10/1976 | Lepert | 526/76 X |
| 4,071,676 | 1/1978 | Werner et al. | 526/283 |
| 4,330,448 | 5/1982 | Iwata | 526/283 X |

FOREIGN PATENT DOCUMENTS

| | | |
|---|---|---|
| 2522080 | 11/1976 | Fed. Rep. of Germany . |
| 2080661 | 11/1971 | France . |
| 2449103 | 9/1980 | France . |
| 53-111399 | 9/1978 | Japan .................. 526/283 |
| 57-17883 | 4/1982 | Japan .................. 526/283 |

OTHER PUBLICATIONS

European Search Report dated Oct. 16, 1989.
Translation of Japanese Kokai Pat. No. 53[1978]-98383 to Wata et al., published Aug. 28, 1978.
H. Staudinger, H. A. Bruson Ann., 447, 97, 110, (1926) (no translation).
J. Japan Pertol. Inst., 27, (1) 26 (1984) (no translation).

*Primary Examiner*—Joseph L. Schofer
*Assistant Examiner*—F. M. Teskin
*Attorney, Agent, or Firm*—Sughrue, Mion, Zinn, Macpeak & Seas

[57] ABSTRACT

A rubber compounding material incorporating a cyclopentadiene-based pertroleum resin prepared by thermally copolymerizing 100 parts by weight of a cyclopentadiene-based feed or dicyclopentadiene-based feed with about 5 to 100 parts by weight of an α-olefin having from 6 to 16 carbon atoms at a temperature of from about 200° to 300° C. for a period of from about 10 minutes to 10 hours in the presence or absence of a solvent.

A rubber composition is also disclosed, composed of this rubber compounding material in combination with a diene-based polymer.

In rubber compositions for tires, the compounding material and rubber composition of the present invention greatly improve resistance to cutting and chipping of the tread.

13 Claims, No Drawings

RUBBER COMPOUNDING MATERIAL AND COMPOSITION

This is a Continuation-in-part of application Ser. No. 07/061,526, filed on 6/15/87, now abandoned.

FIELD OF THE INVENTION

The present invention relates to a rubber compounding material composed of a cyclopentadiene-based petroleum resin that is produced by thermal copolymerization of a cyclopentadiene-based feed with an $\alpha$-olefin. The present invention also relates to a rubber composition prepared by compounding this petroleum resin with a dienebased polymer. A tire made of this rubber composition has greatly improved resistance to cutting and chipping in the tread.

BACKGROUND OF THE INVENTION

Heavy-duty tires used on buses and trucks running on expressways, as well as OTR (off-the-road) tires used on earthmovers are usually subjected to severe conditions during service and are constantly placed under high loads. In particular, OTR tires which frequently and violently contact stones and rocks have a great tendency to develop cutting or chipping in their tread portions. The resulting cuts and chips are of course great potential hazards to the driver.

Efforts have long been made to improve the resistance of tires to cutting and chipping, by such methods as the selection of an optimum diene-based polymer from such products as natural rubber and styrene-butadiene rubber (SBR), and the addition of a cyclopentadiene-based petroleum resin as a reinforcing material. It has been disclosed that -a tire having improved resistance to cutting and chipping in the tread portion can be produced from SBR or natural rubber which has incorporated therein a cyclopentadiene-based resin (Japanese Patent Publication No. 38615/73), a cyclopentadiene resin modified with a phenolic resin (Japanese Patent Publication No. 43664/77), or a cyclopentadiene-oxystyrene copolymer (Japanese Patent Publication No. 18938/83). However, none of these tires is completely satisfactory and in view of today's rapid increase in traffic volume and the ever-increasing severity of the conditions in which vehicles are used, tires having an even higher performance are needed.

In order to evaluate the degree of cutting or chipping that develops in the tread portion of a rapidly revolving tire or a tire revolving under a high load resulting from violent contact or abrasion with stones or rocks, the tire must be subjected to practical performance tests including field (on-the-road) tests, simulation tests on miniature tires, and impact cutting tests. However, these tests are highly complicated and involve great cost, labor and time. Fortunately, each of the above-mentioned patents describes a tensile test that can be used to predict the practical performance of tires in the laboratory, and it has been confirmed that the results of this test correlates well with the actual performance of tires in use. The basis of this tensile test is the determination of the elastic energy characteristics of a rubber composition, by measuring its elongation and stress values.

The suitability of this method rests on the fact that the degree of cutting or chipping that develops in the tread portion of a tire depends on how much of the energy generated upon violent contact or abrasion of the tire with stones or rocks can be absorbed by the tread portion.

SUMMARY OF THE INVENTION

An object, therefore, of the present invention is to provide a rubber composition having enhanced elastic energy characteristics, i.e., greater stress and elongation values and in particular high elongation, both at room temperature and at an elevated temperature (100° C.) so as to improve resistance to cutting and chipping when used in tires.

Another object of the present invention is to provide a compounding material suitable for use in making such a rubber composition.

As a result of intensive studies on a variety of compounding petroleum resins for use in making rubber compositions, the present inventors have found that these and other objects of the present invention can be attained by a rubber-composition containing a compounding material incorporating a cyclopentadiene-based petroleum resin prepared by thermally copolymerizing 100 parts by weight of a cyclopentadiene-based feed or dicyclopentadiene-based feed with about 5 to 100 parts by weight of an $\alpha$-olefin having from 6 to 16 carbon atoms at a temperature of from about 200 to 300° C. for a period of from about 10 minutes to 10 hours in the presence or absence of a solvent. The present invention has been accomplished on the basis of this finding.

Accordingly, the present invention also provides a rubber composition containing a diene-based polymer and the above-described compounding material.

DETAILED DESCRIPTION OF THE INVENTION

The cyclopentadiene-based petroleum resin of which the compounding material of the present invention is made, and which is incorporated in the rubber composition of the present invention may be prepared from cyclopentadiene-based feeds produced by steam cracking of naphtha or other crude oil products and which are chiefly composed of cyclopentadiene, dicyclopentadiene, alkyl-substituted forms thereof, or mixtures thereof. A cyclopentadienemethyl cyclopentadiene codimer, cyclopentadiene-isoprene codimer, or a cyclopentadiene-piperylene codimer may be contained in such cyclopentadiene-based materials. As the cyclopentadiene-based feeds, a dimer which is composed of a cyclopentadiene as a mother skeleton is preferred. Satisfactory results are attained if the cyclopentadiene-based feeds contain at least about 15 wt%, and preferably at least about 30 wt% of a substituted or unsubstituted alicyclic diene, for example, the alicyclic dienes listed above. If the content of the alicyclic dienes is less than 15 wt%, the yield of the resin finally obtained is reduced. In addition to this lack of economy, the resin obtained can have inadequate stability depending upon the nature of impurities present. If, on the other hand, the content of alicyclic dienes is more than 90 wt%, the cyclopentadiene-based feeds may be diluted with up to 200 wt% of xylene or other appropriate solvents as required.

The cyclopentadiene-based feeds can also contain olefinic monomers that are copolymerizable with the alicyclic dienes. Examples of such copolymerizable olefinic monomers include aliphatic diolefins, vinyl-substituted aromatics, and mixtures thereof. However, it is undesirable in the copolymerization of the present invention for these olefinic monomers to precede α-olefins. Therefore, the concentration of these olefinic co-monomers is preferably as low as possible, although their presence in concentrations of less than about 10 wt% of the alicyclic dienes is tolerable.

In addition to the cyclopentadiene-based feeds, α-olefins having from 6 to 16 carbon atoms are also used as a starting material for preparing the cyclopentadiene-based petroleum resin. Industrially, it is advantageous to use α-olefins that are derived from such olefins as ethylene, propylene, and butene, although the present invention is not limited to those specific examples. Preferably, α-olefins having from 6 to 12 carbon atoms, more preferably from 6 to 10 carbon atoms, are used. If α-olefins having fewer than 6 carbon atoms are used, the pressure in the polymerization system must be increased to an extent beyond the capacity of a typical reactor. Furthermore, such α-olefins tend to react with cyclopentadienes so rapidly as to undesirably increase the formation of a resin that has a relatively low molecular weight and a low softening point. On the other hand, α-olefins having more than 16 carbon atoms tend to react with cyclopentadienes so slowly that the main reactions are undesirable, therefore the yield of the desired resin is low.

In the test for evaluating tensile characteristics, especially tensile characteristics at 100° C., rubber that incorporates a cyclopentadiene-based petroleum resin prepared using straight-chained α-olefins exhibits a fairly high elongation but its 300% modulus is low; while rubber that incorporates a cyclopentadiene-based petroleum resin prepared using branched α-olefins has balanced characteristics as manifested by high 300% modulus and good elongation. In addition, straight-chained α-olefins react with the cyclopentadiene-based feed more rapidly than α-olefins branched at the β-position carbon, increasing the difficulty of producing resins having consistent quality. For these reasons, the α-olefin having from 6 to 16 carbon atoms used in the present invention is preferably branched rather than straight-chained, and those which are branched at the β-carbon position are particularly preferred. Specific examples of the preferred α-olefin are diisobutylene and triisobutylene derived from isobutylene. These α-olefins may be used either alone or in mixtures of α-olefins having a varying number of carbon atoms within the range of from 6 to 16. To ensure an efficient reaction, the α-olefin composition preferably contains at least 50 wt% of total α-olefin. The α-olefin used as a starting material may contain up to 50 wt% of a α-olefin, but under the reaction conditions employed in the present invention, the rate of polymerization of the β-olefin with the cyclopentadiene-based based feed is slow as compared with the α-olefin, and the β-olefin will consequently serve as a diluent rather than as a reactant with the cyclopentadiene-based feed.

The cyclopentadiene-based petroleum resin used as the compounding material of the present invention is prepared by thermally copolymerizing 100 parts by weight of the cyclopentadiene-based feed with about 5 to 100 parts, preferably from about 10 to 80 parts, more preferably from about 25 to 75 parts, by weight of an α-olefin having from 6 to 16 carbon atoms either with or without a solvent. If the proportion of the α-olefin is less than about 5 parts by weight, the advantages of the present invention will not be attained. If the proportion of this α-olefin exceeds about 100 parts by weight, the softening point of the resin obtained is lowered and the percentage composition of cyclopentadienes that are effective rubber compounding ingredients is undesirably decreased. The following conditions may be employed for thermal polymerization: temperature: about 200–300° C., preferably about 230–300° C., and more preferably about 230–290° C.; time: about 10 min.–10 hr., preferably about 1–4 hr. Thermal polymerization may be performed with a batch or continuous reactor (e.g., a pressure apparatus having stirring blades). The reaction system is pressurized to a value that is high enough to keep the system in a liquid phase. Though the exact reaction pressure, is not limited to any particular value and depends on the type of α-olefin, solvent, or cyclopentadiene-based feed employed, the pressure is, for example, from about 10 to 30 kg/cm$^2$.G in the present invention. Whether a solvent such as benzene, xylene, n-hexane, or kerosine is used or not depends on the purity of the cyclopentadiene-based feed or α-olefin used. If both of these materials have a high purity, a solvent is preferably used to ensure an efficient reaction, but if either one or both of these materials is of low purity, no solvent is necessary. When a solvent is necessary, an aromatic hydrocarbon (e.g., xylene, toluene, benzene, etc.), an aliphatic saturated hydrocarbon (e.g., heptane, octane, etc.), or a gas oil is generally used.

After completion of the thermal polymerization, any unreacted starting materials and low-molecular weight polymers are removed from the reaction system under pressure, reduced pressure or atmospheric pressure so as to obtain a cyclopentadiene-based petroleum resin having a softening point of from about 80 to 140° C., preferably from about 85 to 120° C. The thus-obtained cyclopentadiene-based petroleum resin is useful as a rubber compounding material of the present invention and can be compounded with a diene-based polymer to make a rubber composition. In the rubber composition according to the present invention, this petroleum resin is incorporated in an amount that typically ranges from about 5 to 40 parts, preferably from about 5 to 20 parts, by weight per 100 parts by weight of the diene-based polymer.

More specifically, the rubber composition of the present invention is prepared, for example, as follows:

The cyclopentadiene-based petroleum resin, the diene-based polymer and additives are admixed at about 70 to 110° C., and the mixture is milled at about 145° C. for about 40 minutes. After vulcanizing and molding, the rubber composition of the present invention is obtained.

The term "diene-based polymer" as used herein includes natural rubber, polybutadiene rubber, styrenebutadiene rubber, isoprene rubber, and mixtures thereof. The additives include, for example, a vulcanizing agent (e.g., a sulfur, a zinc white, etc.), a reinforcing agent (e.g., a carbon black, etc.), an activator (e.g., a stearic acid, etc.), a curing accelerator, etc.

Although the compounding material of the present invention can be produced in a very simple manner, it is a very effective rubber compounding ingredient, and provides a rubber composition incorporating this material having a resistance to cutting and chipping that is at least about 10 to 20% higher than that attained by employing known cyclopentadiene-based petroleum resins.

The following examples are provided for the purpose of further illustrating specific embodiments of the present invention, but are in no sense to be construed as limiting the scope thereof. Rubber compositions were prepared in these examples according to the standard formulation shown in Table 1, in which the proportions of the components are expressed in parts by weight. Unless otherwise indicated, all parts, percents and ratios are by weight. The curing accelerator and other additives employed in these rubber compositions were also common products.

Blending of the components was performed in a roll mill by a routine method (JIS K 6383). The physical properties such as tensile strength, 300% tensile stress, tensile elongation and hardness of each of the rubber compositions were evaluated by the method of JIS K 6301, with hardness being measured with a spring-type tester (JIS type A). In Comparative Example 1, a cyclopentadiene-based petroleum resin was prepared by polymerizing a cyclopentadiene-based feed solely without an α-olefin by a conventional method.

COMPARATIVE EXAMPLE 1

An autoclave (inner capacity: 2,000 ml) was charged with 600 g of a cyclopentadiene-based feed and 400 g of xylene. The cyclopentadiene-based feed had been prepared by steam cracking of naphtha and contained 75.0 wt% of cyclopentadienes. Polymerization was effected by maintaining the contents at 260° C. for 3 hours with stirring in a nitrogen atmosphere. When the reaction was completed, the reaction system was immediately cooled and the resulting product was recovered from the autoclave. By vacuum distillation at 150° C., xylene and any unreacted cyclopentadienes and low-molecular weight polymers were removed from the polymerization product. As a result, 448 g of a cyclopentadiene-based resin having a softening point of 91.7° C. was obtained.

EXAMPLE 1

A mixture of 200 g of 1-decene (purity: 97 wt%) derived from ethylene and 800 g of a cyclopentadiene-based feed (purity: 75.6 wt%) was polymerized as in Comparative Example 1. Any unreacted feed and other impurities were removed from the polymerization product under vacuum at 250° C. As a result, 594 g of a cyclopentadiene-based petroleum resin having a softening point of 92.5° C. was obtained.

EXAMPLE 2

A mixture of 200 g of diisobutylene derived from isobutylene and 800 g of a cyclopentadiene-based feed having a purity of 75.0 wt% was polymerized as in Comparative Example 1. Thereafter, any unreacted starting materials and other impurities were removed from the polymerization product under vacuum at 145° C. As a result, a cyclopentadiene-based resin having a softening point of 99° C. was obtained in an amount of 651 g.

The diisobutylene used in this example had an olefin purity of 96.3 wt% (75.4 wt%, 2,4,4-trimethyl-pentene-1 and 20.9 wt% 2,4,4-trimethylpentene-2). A material balance calculation showed that 2,4,4-trimethyl-pentene-2 had undergone little reaction with the cyclopentadiene-based feed.

EXAMPLE 3

A mixture of 100 g of 1-hexene (purity: 98 wt%) derived from ethylene, 800 g of a cyclopentadiene-based feed (purity: 75.6 wt%) and 100 g of xylene was polymerized as in Comparative Example 1. Thereafter, the solvent and any other unwanted materials were removed from the reaction product under vacuum at 190° C. to obtain 621 g of a cyclopentadiene-based resin having a softening point of 89.1° C.

EXAMPLE 4

A mixture of 400 g of diisobutylene which was the same as used in Example 2 and 600 g of a cyclo-pentadiene-based feed having a purity of 68.6 wt% was polymerized as in Comparative Example 1. Thereafter, any unreacted starting materials were removed from the polymerization product under vacuum at 170° C. to obtain 397 g of a cyclopentadiene-based feed having a softening point of 93.5° C.

Each of the cyclopentadiene-based resins prepared in Comparative Example 1 and Examples 1 to 4 was formulated in a rubber composition which was then subjected to a tensile test. The formulation of each rubber composition is identified in Table 1, and the results of the tensile tests are summarized in Table 2, from which it can be seen that the samples incorporating the petroleum resins prepared in Examples 1 to 4 had much better elastic energy characteristics than the sample using the petroleum resin prepared in Comparative Example 1.

TABLE 1

| | |
|---|---|
| SBR-1500 | 100 parts by weight |
| Zinc white No. 1 | 5.0 parts by weight |
| Stearic acid | 3.0 parts by weight |
| Sulfur | 2.0 parts by weight |
| Curing accelerator MBTS | 1.0 parts by weight |
| Curing accelerator DPG | 0.5 parts by weight |
| HAF carbon black | 50 parts by weight |
| Petroleum resin | 10 parts by weight |
| Manufacturers of components | |
| SBR-1500 | Japan Synthetic Rubber Co., Ltd. |
| Zinc white No. 1 | Sakai Chemical Industry Co., Ltd. |
| Stearic acid | Higashi Nihon Rika K.K. |
| Sulfur | Hosoi Chemical Industry Co., Ltd. |
| Curing accelerator MBTS | Ouchi-Shinko Chemical Industrial Co., Ltd. |
| Curing accelerator DPG | Ouchi-Shinko Chemical Industrial Co., Ltd. |
| HAF carbon black | Asahi Carbon Co., Ltd. |

COMPARATIVE EXAMPLE 2

A mixture of 76 g of isobutene (purity: 99.0 wt%), 800 g of a cyclopentadiene-based feed (purity: 75.6 wt%), and 126 g of xylene as a solvent was polymerized as in Comparative Example 1. The solvent and any unreacted starting materials and low-molecular weight polymers were removed from the reaction product under vacuum at 150° C. to obtain 669 g of a cyclopentadiene-based resin having a softening point of 102° C. Results of the tensile test of rubber compositions prepared by the resin are shown in Table 2.

As is clear from these results, a resin prepared by copolymerizing the cyclopentadiene-based feed with an α-olefin having fewer than 6 carbon atoms was ineffective in improving the elastic energy characteristics of the resulting rubber.

TABLE 2

|  | Hardness (Hs) | | Tensile strength (kg/cm²) | | Elongation (%) | | 300% Tensile strength (kg/cm²) | |
| --- | --- | --- | --- | --- | --- | --- | --- | --- |
|  | Room temperature | 100° C. | Room temperature | 100° C. | Room temperature | 100° C. | Room temperature | 100° C. |
| Comparative Example 1 | 66 | 59 | 275 | 138 | 640 | 420 | 101 | 86 |
| Example 1 | 66 | 58 | 290 | 140 | 740 | 520 | 93 | 77 |
| Example 2 | 69 | 58 | 297 | 139 | 730 | 510 | 99 | 85 |
| Example 3 | 66 | 59 | 292 | 137 | 720 | 500 | 96 | 81 |
| Example 4 | 68 | 58 | 293 | 138 | 740 | 480 | 98 | 87 |
| Comparative Example 2 | 67 | 58 | 280 | 135 | 640 | 430 | 99 | 85 |

While the invention has been described in detail and with reference to specific embodiments thereof, it will be apparent to one skilled in the art that various changes and modifications can be made therein without departing from the spirit and scope thereof.

What is claimed is:

1. A rubber compounding material comprising a cyclopentadiene-based petroleum resin prepared by thermally copolymerizing (a) 100 parts by weight of a cyclopentadiene-based feed or dicyclopentadiene-based feed, each feed containing at least about 15 wt% of a substituted or unsubstituted alicyclic diene with (b) about 5 to 100 parts by weight of an α-olefin having from 6 to 16 carbon atoms at a temperature of from about 200 to 300° C. for a period of from about 10 minutes to 100 hours in the presence or absence of a solvent.

2. The rubber compounding material as claimed in claim 1, wherein said substituted or unsubstituted alicyclic diene is selected from a cyclopentadiene, a dicyclopentadiene, an alkyl-substituted cyclopentadiene and an alkyl-substituted dicyclopentadiene.

3. The rubber compounding material as claimed in claim 1, wherein said cyclopentadiene-based feed or dicyclopentadiene-based feed comprises at least about 30 wt% of a component selected from a cyclopentadiene, a dicyclopentadiene, an alkyl-substituted cyclopentadiene, and an alkyl-substituted dicyclopentadiene.

4. The rubber compounding material as claimed in claim 3, wherein said cyclopentadiene-based feed or dicyclopentadiene-based feed comprises at least about 50 wt% of a component selected from a cyclopentadiene, a dicyclopentadiene, an alkyl-substituted cyclopentadiene, and an alkyl-substituted dicyclopentadiene.

5. The rubber compounding material as claimed in claim 1, wherein said α-olefin has from 6 to 12 carbon atoms.

6. The rubber compounding material as claimed in claim 1, wherein said α-olefin is a branched α-olefin.

7. The rubber compounding material as claimed in claim 6, wherein said α-olefin is branched at the β-carbon position.

8. The rubber compounding material as claimed in claim 7, wherein said α-olefin is a diisobutylene or a triisobutylene.

9. The rubber compounding material as claimed in claim 1, wherein said cyclopentadiene-based feed or dicyclopentadiene-based feed is present in an amount of 100 parts by weight and said α-olefin is present in an amount of from about 10 to 80 parts by weight.

10. The rubber compounding material as claimed in claim 1, wherein said thermal copolymerization is performed at a temperature of about 230 to 300° C.

11. A rubber composition comprising a diene-based polymer selected from the group consisting of natural rubber, polybutadiene rubber, styrene-butadiene rubber, and isoprene rubber, alone or in combination thereof and cyclopentadiene-based petroleum resin prepared by thermally copolymerizing (a) 100 parts by weight of a cyclopentadiene-based feed or dicyclopentadiene-based feed, each feeding containing at least about 15 wt% of a substituted or unsubstituted alicyclic diene, with (b) about 5 to 100 parts by weight of an α-olefin having from 6 to 16 carbon atoms at a temperature of from about 200 to 300° C. for a period of from about 10 minutes to 10 hours in the presence of absence of a solvent, wherein said cyclopentadiene-based petroleum resin is present in an amount of about 5 to 40 parts by weight per 100 parts by weight of said diene-based polymer.

12. The rubber composition as claimed in claim 10, wherein said petroleum resin is present in an amount of from about 5 to 20 parts by weight per 200 parts by weight of said diene-based polymer.

13. The rubber composition as claimed in claim 11, wherein said substituted or unsubstituted alicyclic diene is selected from a cyclopentadiene, a dicyclopentadiene, an alkyl-substituted cyclopentadiene, and an alkyl-substituted dicyclopentadiene.

* * * * *